United States Patent
Nebgen et al.

(10) Patent No.: US 6,964,798 B2
(45) Date of Patent: Nov. 15, 2005

(54) MULTI-LAYERED POLYMER BASED THIN FILM STRUCTURE FOR MEDICAL GRADE PRODUCTS

(75) Inventors: Gregg Nebgen, Burlington, WI (US); Keith Anderson, Libertyville, IL (US); Mike Scharf, McHenry, IL (US)

(73) Assignee: Baxter International Inc., Deerfield, IL (US)

( * ) Notice: Subject to any disclaimer, the term of this patent is extended or adjusted under 35 U.S.C. 154(b) by 23 days.

(21) Appl. No.: 10/105,559

(22) Filed: Mar. 21, 2002

(65) Prior Publication Data

US 2002/0164492 A1 Nov. 7, 2002

Related U.S. Application Data

(63) Continuation-in-part of application No. 09/498,674, filed on Feb. 7, 2000, now Pat. No. 6,461,696, which is a continuation-in-part of application No. 09/334,957, filed on Jun. 17, 1999, now Pat. No. 6,261,655, which is a continuation of application No. 08/153,602, filed on Nov. 16, 1993, now Pat. No. 5,998,019.

(51) Int. Cl.[7] .................. B32B 27/08; B32B 27/30; B32B 27/32; B32B 27/34; B32B 27/40

(52) U.S. Cl. ................ 428/34.5; 428/36.6; 428/36.7; 428/355 AK; 428/355 EN; 428/355 BL; 428/355 CN; 428/355 AC; 428/355 N; 428/515; 428/516; 428/517; 428/519; 428/520; 428/521; 428/522; 428/523; 428/424.2; 428/424.8; 428/476.3; 428/476.9; 525/66; 525/88; 525/92 R; 525/92 B; 525/93; 525/95; 525/96; 525/178; 525/185; 525/191; 525/222; 525/240; 525/241

(58) Field of Search .................. 428/34.5, 36.6, 428/36.7, 355 AK, 355 EN, 355 BL, 355 CN, 355 AC, 355 N, 515, 516, 517, 518, 520, 521, 522, 523, 424.2, 424.8, 476.3, 476.9; 525/66, 887, 92 R, 92 B, 93, 95, 96, 178, 185, 141, 222, 240, 241

(56) References Cited

U.S. PATENT DOCUMENTS

| | | | |
|---|---|---|---|
| 2,705,223 A | 3/1955 | Renfrew et al. | 200/18 |
| 3,255,923 A | 6/1966 | Soto | 222/80 |

(Continued)

FOREIGN PATENT DOCUMENTS

| | | |
|---|---|---|
| DE | 0 251 904 A3 | 12/1987 |
| DE | 41 42 271 A1 | 6/1993 |

(Continued)

OTHER PUBLICATIONS

Eval Company of America, Data Sheet: "Eval® Resin: Ethylene vinyl Alcohol Copolymer, F100A, 32 mol % Ethylene High Barrier Resin for Multilayer Barrier Structures" 3 pgs., undated.

(Continued)

*Primary Examiner*—Vivian Chen
(74) *Attorney, Agent, or Firm*—Ira D. Finkelstein; Paula J. F. Kelly; Robert M. Barrett

(57) ABSTRACT

A multiple layer structure comprising a first and a second skin layer, each skin layer composed of a polypropylene containing polymer, and a radio frequency ("RF") susceptible layer adhered to and between the first and second skin layers. The RF layer has a first component of a propylene based polymer, a second component of a non-propylene polyolefin, a third component of a radio frequency susceptible polymer, and a fourth component of a polymeric compatibilizing agent.

53 Claims, 4 Drawing Sheets

U.S. PATENT DOCUMENTS

| | | |
|---|---|---|
| 3,375,300 A | 3/1968 | Ropp .......................... 260/857 |
| 3,494,897 A | 2/1970 | Reding et al. ............. 260/78.5 |
| 3,514,359 A | 5/1970 | Frese ......................... 156/308 |
| 3,536,693 A | 10/1970 | Schrader et al. ........... 260/94.9 |
| 3,772,136 A | 11/1973 | Workman .................. 161/169 |
| 3,912,843 A | 10/1975 | Brazier ....................... 428/474 |
| 3,937,758 A | 2/1976 | Castagna .................... 260/876 |
| 3,955,040 A | 5/1976 | Schirmer .................... 428/474 |
| 3,995,084 A | 11/1976 | Berger et al. ................. 428/35 |
| 4,005,710 A | 2/1977 | Zeddies et al. .............. 128/214 |
| 4,041,103 A | 8/1977 | Davison et al. ............. 260/857 |
| 4,058,647 A | 11/1977 | Inoue et al. ................. 428/474 |
| 4,064,296 A | 12/1977 | Bornstein et al. ............. 428/35 |
| 4,082,854 A | 4/1978 | Yamada et al. .............. 426/106 |
| 4,082,877 A | 4/1978 | Shadle ......................... 428/35 |
| 4,087,587 A | 5/1978 | Shida et al. ................. 428/500 |
| 4,087,588 A | 5/1978 | Shida et al. ................. 428/500 |
| 4,095,012 A | 6/1978 | Schirmer .................... 428/474 |
| 4,103,686 A | 8/1978 | LeFevre ...................... 128/214 |
| 4,110,303 A | 8/1978 | Gergen et al. ........... 260/42.18 |
| 4,147,827 A | 4/1979 | Breidt, Jr. et al. .......... 428/218 |
| 4,197,326 A | 4/1980 | Wakamatsu et al. ........ 426/412 |
| 4,212,956 A | 7/1980 | Katsura ........................ 525/60 |
| 4,212,966 A | 7/1980 | McClain ..................... 528/486 |
| 4,220,684 A | 9/1980 | Olson ........................... 428/35 |
| 4,230,830 A | 10/1980 | Tanny et al. ................. 525/222 |
| 4,233,367 A | 11/1980 | Ticknor et al. ........... 428/476.3 |
| 4,239,826 A | 12/1980 | Knott, II et al. .............. 428/35 |
| 4,244,378 A | 1/1981 | Brignola .................... 128/766 |
| 4,254,169 A | 3/1981 | Schroeder .................... 428/35 |
| 4,255,490 A | 3/1981 | Katsura ...................... 428/483 |
| 4,281,045 A | 7/1981 | Sumi et al. ................. 428/516 |
| 4,284,674 A | 8/1981 | Sheptak ........................ 428/69 |
| 4,286,628 A | 9/1981 | Paradis et al. .............. 137/843 |
| 4,310,017 A | 1/1982 | Raines ........................ 137/533 |
| 4,311,807 A | 1/1982 | McCullough, Jr. et al. . 525/197 |
| 4,322,465 A | 3/1982 | Webster ...................... 428/194 |
| 4,322,480 A | 3/1982 | Tuller et al. .............. 428/476.1 |
| 4,327,726 A | 5/1982 | Kwong ....................... 128/272 |
| 4,332,655 A | 6/1982 | Berejka .................... 204/159.2 |
| 4,336,352 A | 6/1982 | Sakurai et al. .............. 525/240 |
| 4,349,644 A | 9/1982 | Iwanami et al. ............... 525/57 |
| 4,350,797 A | 9/1982 | Marzola et al. ............ 525/29.3 |
| 4,355,721 A | 10/1982 | Knott, II et al. .......... 206/524.2 |
| 4,361,628 A | 11/1982 | Krueger et al. ........... 428/475.8 |
| 4,369,812 A | 1/1983 | Paradis et al. .............. 137/843 |
| 4,387,184 A | 6/1983 | Coquard et al. ............. 525/183 |
| 4,397,916 A | 8/1983 | Nagano ....................... 428/461 |
| 4,397,917 A | 8/1983 | Chi et al. ...................... 429/26 |
| 4,405,667 A | 9/1983 | Christensen et al. .......... 428/35 |
| 4,407,873 A | 10/1983 | Christensen et al. .......... 428/35 |
| 4,407,877 A | 10/1983 | Rasmussen .................. 428/125 |
| 4,407,888 A | 10/1983 | Crofts ......................... 428/355 |
| 4,417,753 A | 11/1983 | Bacehowski et al. .......... 285/21 |
| 4,429,076 A | 1/1984 | Saito et al. .................... 525/57 |
| 4,445,550 A | 5/1984 | Davis et al. ................. 141/329 |
| 4,457,960 A | 7/1984 | Newsome .................... 428/35 |
| 4,460,632 A | 7/1984 | Adur et al. .................... 428/35 |
| 4,464,438 A | 8/1984 | Lu .............................. 428/516 |
| 4,465,487 A | 8/1984 | Nakamura et al. ........... 604/408 |
| 4,468,427 A | 8/1984 | Degrassi et al. ............. 428/220 |
| 4,479,989 A | 10/1984 | Mahal .......................... 428/35 |
| 4,486,497 A | 12/1984 | Mizutani .................... 428/332 |
| 4,501,798 A | 2/1985 | Koschak et al. ............. 428/349 |
| 4,521,437 A | 6/1985 | Storms ........................ 426/130 |
| 4,528,219 A | 7/1985 | Yamada et al. ............ 428/36.6 |
| 4,536,409 A | 8/1985 | Farrell et al. ................ 426/398 |
| 4,536,532 A | 8/1985 | Miller et al. ................. 524/141 |
| 4,548,348 A | 10/1985 | Clements .................... 220/738 |
| 4,551,371 A | 11/1985 | Eckstein ....................... 222/92 |
| 4,552,714 A | 11/1985 | Krueger et al. ........ 264/173.14 |
| 4,552,716 A | 11/1985 | Habich .................... 264/328.1 |
| 4,552,801 A | 11/1985 | Odorzynski et al. ........ 428/220 |
| 4,561,110 A | 12/1985 | Herbert ...................... 604/408 |
| 4,561,920 A | 12/1985 | Foster .................... 156/244.11 |
| 4,562,118 A | 12/1985 | Maruhashi et al. .......... 428/412 |
| 4,568,333 A | 2/1986 | Sawyer et al. .............. 604/122 |
| 4,568,723 A | 2/1986 | Lu ........................... 525/92 E |
| 4,572,854 A | 2/1986 | Dallmann et al. ........ 206/524.1 |
| 4,573,994 A | 3/1986 | Fischell et al. ........... 604/891.1 |
| 4,579,784 A | 4/1986 | Lemstra et al. .............. 428/516 |
| 4,588,177 A | 5/1986 | White .......................... 269/41 |
| 4,588,648 A | 5/1986 | Krueger et al. ........... 428/475.8 |
| 4,590,131 A | 5/1986 | Yazaki et al. ................ 428/514 |
| 4,599,276 A | 7/1986 | Martini ....................... 428/520 |
| 4,605,576 A | 8/1986 | Jabarin ...................... 428/36.6 |
| 4,615,922 A | 10/1986 | Newsome et al. .......... 428/35.4 |
| 4,615,926 A | 10/1986 | Hsu et al. ................... 428/35.2 |
| 4,617,240 A | 10/1986 | Krueger et al. ........... 428/476.1 |
| 4,619,849 A | 10/1986 | Anzawa et al. ........... 206/524.6 |
| 4,627,844 A | 12/1986 | Schmitt ...................... 604/264 |
| 4,628,969 A | 12/1986 | Jurgens, Jr. et al. ............. 141/1 |
| 4,636,412 A | 1/1987 | Field .......................... 604/408 |
| 4,639,398 A | 1/1987 | Bergström ................. 428/451 |
| 4,640,870 A | 2/1987 | Akazawa et al. ............ 428/483 |
| 4,643,926 A | 2/1987 | Mueller ..................... 428/35.2 |
| 4,645,695 A | 2/1987 | Negi et al. ................ 220/62.22 |
| 4,647,483 A | 3/1987 | Tse et al. .................... 206/204 |
| 4,650,452 A | 3/1987 | Jensen ........................ 493/206 |
| 4,650,721 A | 3/1987 | Ashcraft et al. ............. 428/516 |
| 4,659,903 A | 4/1987 | Berne et al. ............ 219/125.11 |
| 4,668,571 A | 5/1987 | Moriarty, Jr. ................ 428/327 |
| 4,672,087 A | 6/1987 | Miller et al. ................. 529/414 |
| 4,677,017 A | 6/1987 | DeAntonis et al. .......... 428/214 |
| 4,683,916 A | 8/1987 | Raines ........................ 137/854 |
| 4,684,364 A | 8/1987 | Sawyer et al. .............. 604/123 |
| 4,684,573 A | 8/1987 | Mueller et al. .............. 428/349 |
| 4,684,576 A | 8/1987 | Tabor et al. ................. 428/441 |
| 4,686,125 A | 8/1987 | Johnston et al. ............. 383/116 |
| 4,692,361 A | 9/1987 | Johnston et al. ........... 428/35.4 |
| 4,695,491 A | 9/1987 | Kondo et al. ............... 428/34.9 |
| 4,699,816 A | 10/1987 | Galli .......................... 428/40.6 |
| 4,702,966 A | 10/1987 | Farrell et al. ................ 428/500 |
| 4,705,708 A | 11/1987 | Briggs et al. ............... 428/36.7 |
| 4,707,389 A | 11/1987 | Ward ......................... 428/36.6 |
| 4,722,725 A | 2/1988 | Sawyer et al. ................ 604/27 |
| 4,724,028 A | 2/1988 | Zabielski et al. ............ 156/256 |
| 4,724,185 A | 2/1988 | Shah ........................... 428/339 |
| 4,726,984 A | 2/1988 | Shah ........................... 428/216 |
| 4,726,997 A | 2/1988 | Mueller et al. .............. 428/480 |
| 4,729,476 A | 3/1988 | Lulham et al. ............ 206/484.2 |
| 4,731,266 A | 3/1988 | Bonnebat et al. .......... 428/36.6 |
| 4,732,795 A | 3/1988 | Ohya et al. ................. 428/34.9 |
| 4,734,327 A | 3/1988 | Vicik .......................... 428/332 |
| 4,735,855 A | 4/1988 | Wofford et al. ............. 428/349 |
| 4,740,582 A | 4/1988 | Coquard et al. .......... 528/339.3 |
| 4,746,562 A | 5/1988 | Fant ........................... 428/213 |
| 4,753,222 A | 6/1988 | Morishita ................... 600/140 |
| 4,755,419 A | 7/1988 | Shah ........................... 428/220 |
| 4,758,463 A | 7/1988 | Vicik et al. ................. 428/216 |
| 4,760,114 A | 7/1988 | Haaf et al. .................... 525/66 |
| 4,764,404 A | 8/1988 | Genske et al. ............. 428/35.3 |
| 4,767,651 A | 8/1988 | Starczewski et al. ....... 428/35.2 |
| 4,770,944 A | 9/1988 | Farrell et al. ............. 428/474.4 |
| 4,772,497 A | 9/1988 | Maasola ..................... 428/349 |
| 4,778,697 A | 10/1988 | Genske et al. ............. 428/35.2 |
| 4,789,575 A | 12/1988 | Gibbons et al. ............ 428/34.2 |
| 4,792,488 A | 12/1988 | Schirmer .................... 428/319 |
| 4,795,782 A | 1/1989 | Lutz et al. .................... 525/66 |
| 4,800,129 A | 1/1989 | Deak ....................... 428/474.4 |
| 4,803,102 A | 2/1989 | Raniere et al. ............. 428/35.2 |

| Patent | Date | Inventor | Class |
|---|---|---|---|
| 4,808,482 A | 2/1989 | Benge et al. | 428/411.1 |
| 4,818,592 A | 4/1989 | Ossian | 428/216 |
| 4,826,955 A | 5/1989 | Akkapeddi et al. | 528/324 |
| 4,828,915 A | 5/1989 | Schroeder et al. | 428/332 |
| 4,834,755 A | 5/1989 | Silvestrini et al. | 623/13.19 |
| 4,839,235 A | 6/1989 | Shah | 428/516 |
| 4,842,947 A | 6/1989 | Jachec et al. | 428/461 |
| 4,855,356 A | 8/1989 | Holub et al. | 525/66 |
| 4,856,259 A | 8/1989 | Woo et al. | 53/374.2 |
| 4,856,260 A | 8/1989 | Woo et al. | 53/374.8 |
| 4,857,399 A | 8/1989 | Vicik | 428/332 |
| 4,857,408 A | 8/1989 | Vicik | 428/474.4 |
| 4,857,409 A | 8/1989 | Hazelton et al. | 428/494 |
| 4,863,996 A | 9/1989 | Nakazima et al. | 525/74 |
| 4,871,410 A | 10/1989 | Bonnebat et al. | 156/244.14 |
| 4,871,799 A | 10/1989 | Kobayashi et al. | 525/64 |
| 4,873,287 A | 10/1989 | Holub et al. | 525/92 B |
| 4,875,587 A | 10/1989 | Lulham et al. | 206/484 |
| 4,877,662 A | 10/1989 | Yazaki et al. | 428/36.7 |
| 4,877,682 A | 10/1989 | Sauers et al. | 428/412 |
| 4,881,649 A | 11/1989 | Hsu et al. | 383/200 |
| 4,883,696 A | 11/1989 | Iwanami et al. | 428/35.4 |
| 4,883,837 A | 11/1989 | Zabrocki | 525/66 |
| 4,885,119 A | 12/1989 | Mueller et al. | 264/471 |
| 4,902,558 A | 2/1990 | Henricksen | 428/220 |
| 4,910,085 A | 3/1990 | Raniere et al. | 428/412 |
| 4,911,963 A | 3/1990 | Lustig et al. | 428/36.41 |
| 4,911,979 A | 3/1990 | Nishimoto et al. | 428/332 |
| 4,915,893 A | 4/1990 | Gogolewski et al. | 264/205 |
| 4,917,925 A | 4/1990 | Loretti et al. | 428/35.7 |
| 4,923,470 A | 5/1990 | Dumican | 623/23.71 |
| 4,929,479 A | 5/1990 | Shishido et al. | 428/35.2 |
| 4,931,520 A | 6/1990 | Yamanashi et al. | 526/281 |
| 4,937,139 A | 6/1990 | Genske et al. | 428/349 |
| 4,948,643 A | 8/1990 | Mueller | 428/36.6 |
| 4,950,515 A | 8/1990 | Mason et al. | 428/36.92 |
| 4,957,966 A | 9/1990 | Nishio et al. | 525/66 |
| 4,957,967 A | 9/1990 | Mizuno et al. | 525/68 |
| RE33,376 E | 10/1990 | Gibbons et al. | 428/34.2 |
| 4,963,426 A | 10/1990 | Nishimoto et al. | 428/213 |
| 4,966,795 A | 10/1990 | Genske et al. | 428/34.3 |
| 4,971,864 A | 11/1990 | McCord | 428/516 |
| 4,975,207 A | 12/1990 | Lee | 529/494 |
| 4,977,213 A | 12/1990 | Giroud-Abel et al. | 525/66 |
| 4,983,432 A | 1/1991 | Bissot | 428/35.7 |
| 4,992,511 A | 2/1991 | Yamamoto et al. | 525/97 |
| 4,996,054 A | 2/1991 | Pietsch et al. | 424/422 |
| 4,999,254 A | 3/1991 | Ofstein | 428/518 |
| 5,003,019 A | 3/1991 | Ishimaru et al. | 526/281 |
| 5,004,647 A | 4/1991 | Shah | 428/349 |
| 5,006,114 A | 4/1991 | Rogers et al. | 604/245 |
| 5,006,601 A | 4/1991 | Lutz et al. | 525/66 |
| 5,008,356 A | 4/1991 | Ishimaru et al. | 526/281 |
| 5,017,652 A | 5/1991 | Abe et al. | 525/68 |
| 5,034,457 A | 7/1991 | Serini et al. | 525/67 |
| 5,034,458 A | 7/1991 | Serini et al. | 525/67 |
| 5,039,565 A | 8/1991 | Deyrup | 428/35.7 |
| 5,040,583 A | 8/1991 | Lin et al. | 152/510 |
| 5,049,449 A | 9/1991 | Ofstein | 428/476.1 |
| 5,053,259 A | 10/1991 | Vicik | 428/36.91 |
| 5,053,457 A | 10/1991 | Lee | 525/78 |
| 5,061,771 A | 10/1991 | Oshima et al. | 526/282 |
| 5,066,290 A | 11/1991 | Measells et al. | 604/408 |
| 5,070,143 A | 12/1991 | Pucci et al. | 525/74 |
| 5,071,686 A | 12/1991 | Genske et al. | 428/35.7 |
| 5,071,911 A | 12/1991 | Furuta et al. | 525/68 |
| 5,071,912 A | 12/1991 | Furuta et al. | 525/68 |
| 5,075,376 A | 12/1991 | Furuta et al. | 525/68 |
| 5,077,109 A | 12/1991 | Lustig et al. | 428/36.91 |
| 5,079,295 A | 1/1992 | Furuta et al. | 525/68 |
| RE33,832 E | 2/1992 | Yoshimura et al. | 525/98 |
| 5,085,649 A | 2/1992 | Flynn | 604/524 |
| 5,085,816 A | 2/1992 | McCord | 264/173.19 |
| 5,087,677 A | 2/1992 | Brekner et al. | 526/160 |
| 5,093,164 A | 3/1992 | Bauer et al. | 428/35.4 |
| 5,093,194 A | 3/1992 | Touhsaent et al. | 428/349 |
| 5,094,921 A | 3/1992 | Itamura et al. | 428/520 |
| 5,108,807 A | 4/1992 | Tucker | 428/35.2 |
| 5,108,844 A | 4/1992 | Blemberg et al. | 428/518 |
| 5,110,642 A | 5/1992 | Genske | 428/35.8 |
| 5,116,906 A | 5/1992 | Mizuno et al. | 525/68 |
| 5,126,198 A | 6/1992 | Schinkel et al. | 428/349 |
| 5,127,904 A | 7/1992 | Loo et al. | 604/83 |
| 5,129,894 A | 7/1992 | Sommermeyer et al. | 604/408 |
| 5,132,149 A | 7/1992 | Kotani et al. | 428/36.7 |
| 5,132,363 A | 7/1992 | Furuta et al. | 525/68 |
| 5,135,785 A | 8/1992 | Millon | 428/35.2 |
| 5,137,763 A | 8/1992 | Bauer et al. | 428/36.7 |
| 5,139,831 A | 8/1992 | Mueller | 428/34.3 |
| 5,141,795 A | 8/1992 | Kai et al. | 428/138 |
| 5,143,570 A | 9/1992 | Freedman | 156/230 |
| 5,145,731 A | 9/1992 | Lund et al. | 428/35.4 |
| 5,149,739 A | 9/1992 | Lee | 525/66 |
| 5,154,979 A | 10/1992 | Kerschbaumer et al. | 428/476.9 |
| 5,156,921 A | 10/1992 | Lin et al. | 428/521 |
| 5,159,004 A | 10/1992 | Furuta et al. | 524/390 |
| 5,164,258 A | 11/1992 | Shida et al. | 428/319.3 |
| 5,164,267 A | 11/1992 | D'Heur et al. | 428/474.4 |
| 5,165,988 A | 11/1992 | Schaefer | 428/220 |
| 5,169,697 A | 12/1992 | Langley et al. | 428/57 |
| 5,171,640 A | 12/1992 | Wirth | 428/515 |
| 5,176,634 A | 1/1993 | Smith et al. | 604/87 |
| 5,176,956 A | 1/1993 | Jevne et al. | 600/391 |
| 5,183,706 A | 2/1993 | Bekele | 428/349 |
| 5,185,189 A | 2/1993 | Stenger et al. | 428/34.8 |
| 5,186,782 A | 2/1993 | Freedman | 156/244.11 |
| 5,189,091 A | 2/1993 | Laughner | 524/445 |
| 5,194,316 A | 3/1993 | Horner et al. | 428/175 |
| 5,196,254 A | 3/1993 | Akiyama | 428/178 |
| 5,206,290 A | 4/1993 | Mizuno et al. | 525/134 |
| 5,207,983 A | 5/1993 | Liebert et al. | 422/25 |
| 5,208,082 A | 5/1993 | Chou | 428/36.6 |
| 5,208,094 A | 5/1993 | Sun | 428/212 |
| 5,212,238 A | 5/1993 | Schelbelhoffer et al. | 525/66 |
| 5,216,062 A | 6/1993 | Lausberg et al. | 524/404 |
| 5,218,048 A | 6/1993 | Abe et al. | 525/92 D |
| 5,218,049 A | 6/1993 | Yamamoto et al. | 525/97 |
| 5,230,934 A | 7/1993 | Sakano et al. | 428/35.7 |
| 5,230,935 A | 7/1993 | Delimoy et al. | 428/36.7 |
| 5,232,754 A | 8/1993 | Waugh | 428/36.7 |
| 5,234,731 A | 8/1993 | Ferguson | 428/34.9 |
| 5,234,903 A | 8/1993 | Nho et al. | 514/6 |
| 5,238,997 A | 8/1993 | Bauer et al. | 525/66 |
| 5,244,971 A | 9/1993 | Dekoninck | 525/64 |
| 5,258,230 A | 11/1993 | LaFleur et al. | 428/412 |
| 5,272,235 A | 12/1993 | Wakatsuru et al. | 526/281 |
| 5,278,231 A | 1/1994 | Chundury | 525/66 |
| RE34,537 E | 2/1994 | Deyrup | 428/35.7 |
| RE34,546 E | 2/1994 | Deyrup | 525/74 |
| 5,283,128 A | 2/1994 | Wilhoit | 428/516 |
| 5,288,531 A | 2/1994 | Falla et al. | 428/35.2 |
| 5,288,560 A | 2/1994 | Sudo et al. | 428/494 |
| 5,288,799 A | 2/1994 | Schmid et al. | 525/66 |
| 5,290,856 A | 3/1994 | Okamoto et al. | 525/64 |
| 5,292,590 A | 3/1994 | Lin et al. | 428/494 |
| 5,300,354 A | 4/1994 | Harita et al. | 428/215 |
| 5,306,542 A | 4/1994 | Bayer | 428/192 |
| 5,312,867 A | 5/1994 | Mitsuno et al. | 525/66 |
| 5,317,059 A | 5/1994 | Chundury et al. | 525/66 |
| 5,318,829 A | 6/1994 | Tada et al. | 428/213 |
| 5,331,057 A | 7/1994 | Brekner et al. | 525/989 |
| 5,342,886 A | 8/1994 | Glotin et al. | 525/66 |

| Patent | Date | Inventor | Class |
|---|---|---|---|
| 5,346,732 A | 9/1994 | Lai et al. | 428/35.7 |
| 5,348,771 A | 9/1994 | Lee et al. | 427/515 |
| 5,348,794 A | 9/1994 | Takahashi et al. | 428/213 |
| 5,352,773 A | 10/1994 | Kandler et al. | 530/385 |
| 5,356,676 A | 10/1994 | von Widdern et al. | 428/34.8 |
| 5,356,709 A | 10/1994 | Woo et al. | 428/376 |
| 5,360,670 A | 11/1994 | Yonezu et al. | 428/412 |
| 5,362,532 A | 11/1994 | Famili et al. | 428/36.6 |
| 5,370,937 A | 12/1994 | Lee et al. | 428/448 |
| 5,371,141 A | 12/1994 | Gelles et al. | 525/66 |
| 5,372,669 A | 12/1994 | Freedman | 156/243 |
| 5,372,880 A | 12/1994 | Lee et al. | 428/336 |
| 5,374,459 A | 12/1994 | Mumpower et al. | 428/36.7 |
| 5,378,543 A | 1/1995 | Murata et al. | 428/517 |
| 5,378,800 A | 1/1995 | Mok et al. | 528/349 |
| 5,380,586 A | 1/1995 | Knoerzer et al. | 428/349 |
| 5,382,631 A | 1/1995 | Stehling et al. | 525/540 |
| 5,387,645 A | 2/1995 | Montag et al. | 525/66 |
| 5,389,448 A | 2/1995 | Schirmer et al. | 428/517 |
| 5,407,713 A | 4/1995 | Wilfong et al. | 428/34.1 |
| 5,422,409 A | 6/1995 | Brekner et al. | 526/281 |
| 5,434,007 A | 7/1995 | Yeh | 428/446 |
| 5,434,010 A | 7/1995 | Smith et al. | 428/520 |
| 5,457,249 A | 10/1995 | Toshihiro et al. | 585/11 |
| 5,462,807 A | 10/1995 | Halle et al. | 428/500 |
| 5,463,375 A | 10/1995 | Bauer | 340/517 |
| 5,464,691 A | 11/1995 | Gardiner et al. | 428/336 |
| 5,466,498 A | 11/1995 | Forloni et al. | 428/36.7 |
| 5,472,792 A | 12/1995 | Tsurutani et al. | 428/516 |
| 5,475,060 A | 12/1995 | Brekner et al. | 525/28.9 |
| 5,482,770 A | 1/1996 | Bekele | 428/339 |
| 5,482,771 A | 1/1996 | Shah | 428/349 |
| 5,487,940 A | 1/1996 | Bianchini et al. | 428/349 |
| 5,489,478 A | 2/1996 | Audry et al. | 428/412 |
| 5,491,009 A | 2/1996 | Bekele | 428/35.7 |
| 5,491,011 A | 2/1996 | Pezzoli et al. | 428/36.7 |
| 5,498,677 A | 3/1996 | Weller et al. | 526/133 |
| RE35,285 E | 6/1996 | Quacquarella et al. | 428/34.9 |
| 5,534,351 A | 7/1996 | Pearson et al. | 428/516 |
| 5,534,606 A | 7/1996 | Bennett et al. | 526/281 |
| 5,547,764 A | 8/1996 | Blais et al. | 428/461 |
| 5,547,765 A | 8/1996 | Degrassi et al. | 428/421.7 |
| 5,552,002 A | 9/1996 | Farrell et al. | 156/82 |
| 5,552,213 A | 9/1996 | Knoerzer | 428/213 |
| 5,552,504 A | 9/1996 | Bennett et al. | 526/348.1 |
| 5,558,930 A | 9/1996 | DiPoto | 428/216 |
| 5,559,176 A | 9/1996 | Namba et al. | 524/377 |
| 5,562,996 A | 10/1996 | Kuriu et al. | 428/474.4 |
| 5,583,192 A | 12/1996 | Bennett et al. | 526/348.1 |
| 5,601,889 A | 2/1997 | Chundury et al. | 428/34.3 |
| 5,604,042 A | 2/1997 | Bianchini et al. | 428/507 |
| 5,604,043 A | 2/1997 | Ahlgren | 428/518 |
| 5,610,253 A | 3/1997 | Hatke et al. | 526/581 |
| 5,618,599 A | 4/1997 | Nulman et al. | 428/36.7 |
| 5,620,425 A | 4/1997 | Hefferman et al. | 604/28 |
| 5,620,758 A | 4/1997 | Babrowicz | 428/35.2 |
| 5,628,629 A | 5/1997 | Mitani et al. | 432/180 |
| 5,629,059 A | 5/1997 | Desai et al. | 428/34.7 |
| 5,629,398 A | 5/1997 | Okamoto et al. | 526/281 |
| 5,637,100 A | 6/1997 | Sudo | 604/238 |
| 5,637,400 A | 6/1997 | Brekner et al. | 428/373 |
| 5,645,906 A | 7/1997 | Park et al. | 428/36.3 |
| 5,650,471 A | 7/1997 | Abe et al. | 526/160 |
| 5,686,527 A | 11/1997 | Laurin et al. | 525/66 |
| 5,693,728 A | 12/1997 | Okamoto et al. | 526/115 |
| 5,698,645 A | 12/1997 | Weller et al. | 526/160 |
| 5,723,189 A | 3/1998 | Sudo | 428/36.5 |
| 5,733,619 A | 3/1998 | Patel et al. | 428/36.91 |
| 5,733,991 A | 3/1998 | Rohrmann et al. | 526/160 |
| 5,744,664 A | 4/1998 | Brekner et al. | 585/12 |
| 5,756,623 A | 5/1998 | Kreuder et al. | 526/308 |
| 5,788,670 A | 8/1998 | Reinhard et al. | 604/89 |
| 5,792,824 A | 8/1998 | Natori | 526/266 |
| 5,795,945 A | 8/1998 | Natori | 526/309 |
| 5,849,843 A | 12/1998 | Laurin et al. | 525/66 |
| 5,854,347 A | 12/1998 | Laurin et al. | 525/66 |
| 5,854,349 A | 12/1998 | Abe et al. | 525/98 |
| 5,863,986 A | 1/1999 | Herrmann-Schonherr et al. | 525/63 |
| 5,872,201 A | 2/1999 | Cheung et al. | 526/282 |
| 5,929,031 A | 7/1999 | Kerwin et al. | 514/12 |
| 5,935,847 A | 8/1999 | Smith et al. | 435/297.5 |
| 5,980,495 A | 11/1999 | Heinz et al. | 604/263 |
| 5,990,254 A | 11/1999 | Weller et al. | 526/160 |
| 5,993,949 A | 11/1999 | Rosenbaum et al. | 428/213 |
| 5,998,019 A | 12/1999 | Rosenbaum et al. | 428/345 |
| 6,007,520 A | 12/1999 | Sudo | 604/181 |
| 6,020,444 A | 2/2000 | Riedel et al. | 526/170 |
| 6,060,572 A | 5/2000 | Gillis et al. | 526/335 |
| 6,065,270 A | 5/2000 | Reinhard et al. | 53/426 |
| 6,068,936 A | 5/2000 | Pfeiffer et al. | 428/500 |
| 6,083,587 A | 7/2000 | Smith et al. | 428/36.6 |
| 6,121,394 A | 9/2000 | Sugimoto et al. | 526/124.3 |
| 6,136,744 A | 10/2000 | Gillis et al. | 502/118 |
| 6,147,025 A | 11/2000 | Gillis et al. | 502/128 |
| 6,149,997 A | 11/2000 | Patel et al. | 428/36.91 |
| 6,168,862 B1 | 1/2001 | Rosenbaum et al. | 428/345 |
| 6,169,052 B1 | 1/2001 | Brekner et al. | 502/152 |
| 6,213,996 B1 | 4/2001 | Jepson et al. | 604/533 |
| 6,217,568 B1 | 4/2001 | Jepson et al. | 604/533 |
| 6,225,426 B1 | 5/2001 | Gillis et al. | 526/160 |
| 6,225,427 B1 | 5/2001 | Burton et al. | 526/160 |
| RE37,208 E | 6/2001 | Winter et al. | 526/348 |
| 6,255,396 B1 | 7/2001 | Ding et al. | 525/191 |
| 6,261,655 B1 | 7/2001 | Rosenbaum et al. | 428/36.7 |
| 6,271,351 B1 | 8/2001 | Gawryl et al. | 530/385 |
| 6,288,027 B1 | 9/2001 | Gawryl et al. | 514/6 |
| 6,344,033 B1 | 2/2002 | Jepson et al. | 604/256 |
| 6,361,843 B1 | 3/2002 | Smith et al. | 428/36.6 |
| 6,399,704 B1 | 6/2002 | Laurin et al. | 525/66 |
| 6,461,696 B1 | 10/2002 | Ling et al. | 428/34.5 |
| 2002/0164492 A1 | 11/2002 | Nebgen et al. | |

FOREIGN PATENT DOCUMENTS

| | | |
|---|---|---|
| EP | 0 092 897 A2 | 2/1983 |
| EP | 0 156 464 A1 | 2/1985 |
| EP | 0 158 035 A2 | 10/1985 |
| EP | 0 230 344 A2 | 7/1987 |
| EP | 0 283 164 A2 | 9/1988 |
| EP | 0 291 208 A2 | 11/1988 |
| EP | 0 291 208 A3 | 11/1988 |
| EP | 0 092 897 B1 | 4/1990 |
| EP | 0 158 035 B1 | 1/1991 |
| EP | 0 216 509 B1 | 9/1991 |
| EP | 0 446 505 A1 | 9/1991 |
| EP | 0 451 977 A1 | 10/1991 |
| EP | 0 465 428 A1 | 1/1992 |
| EP | 0 465 681 B1 | 1/1992 |
| EP | 0 497 567 A2 | 5/1992 |
| EP | 0 504 808 A1 | 9/1992 |
| EP | 0 524 802 A1 | 1/1993 |
| EP | 0 561 428 A1 | 9/1993 |
| EP | 0 709 105 A1 | 6/1995 |
| EP | 0 492 982 B1 | 8/1995 |
| EP | 0 430 585 B1 | 1/1996 |
| EP | 0 698 487 A1 | 2/1996 |
| EP | 0 156 464 B1 | 5/1996 |
| EP | 0 582 355 B1 | 5/1996 |
| EP | 0 203 799 B1 | 7/1996 |
| EP | 0 384 694 B1 | 9/1996 |
| EP | 0 291 208 B1 | 8/1997 |
| EP | 0 790 063 A1 | 8/1997 |

| | | |
|---|---|---|
| EP | 0 680 401 B1 | 1/1999 |
| EP | 0 709 105 B1 | 12/2001 |
| FR | 2688511 | 9/1993 |
| GB | 2 131 739 A | 6/1984 |
| GB | 2 177 974 A | 2/1987 |
| JP | 03-095286 | 4/1991 |
| JP | 05-277154 | 10/1993 |
| JP | 11-071554 | 3/1999 |
| WO | 83/00158 A1 | 1/1983 |
| WO | 86/07010 A1 | 1/1986 |
| WO | 93/23093 A1 | 11/1993 |
| WO | 97/08054 A1 | 3/1997 |
| WO | 98/27926 A1 | 7/1998 |
| WO | 98/44043 A1 | 10/1998 |
| WO | 99/15289 A2 | 4/1999 |
| WO | 99/48990 A1 | 9/1999 |

OTHER PUBLICATIONS

Irvine Scientific, Data Sheet: "Tissue Culture Products, Media Manager® Product Line", 1 pg., undated.

Mediatech, Inc., Brochure: "Mediatech Flexible Packaging Systems. Media Bags—Cellgro®", 8 pgs., undated.

Mediatech, Inc., website printout: "Cellgro® Flexible Packaging by Mediatech, Inc.: Mediatech Flexible Packaging Systems, Media Bags, Taking Bags to the 21$^{st}$ Century", www.cellgro.com/cellgro13.cfm, 2 pgs., Feb. 10, 2000.

Mediatech, Inc., website printout: "Cellgro® Antibiotics by Mediatech, Inc.: Cellgro® Flexible Collection Containers and Totes", www.cellgro.com/cellgro9.cfm, 1 pg., Feb. 10, 2000.

JRH Biosciences, Inc., Brochure "When it comes to bulk liquid customization, Nobody configures better." Aug. 1999, 4 pgs.

BioWhittaker, Inc., Brochure "The UltraPak™ Liquid Transfer System", May 1997, 4 pgs.

Sigma–Aldrich, Brochure "Bulk Liquid Packaging", 4 pgs., undated.

Sigma–Aldrich, Brochure "Custom Product Capabilities", 4 pgs., undated.

Wave Biotech LLC, Catalog "Wave Bioreactor® System 20" and price list, 10 pgs., Jan. 2000.

Genetic Engineering News, "BioProcess Tutorial, Novel Disposable Bioreactor", vol. 19, No. 5, Mar. 1, 1999, 4 pgs.

Wave Biotech LLC, "Disposable Cell Culture Technology: Wave Bioreactor", 4 pgs., undated.

Wave Biotech LLC, datasheets/website printouts, Jan. 6, 2000, 10 pgs.

American Fluoroseal Corporation, website printouts, www.teflonbag.com, Feb. 11, 2000, 11 pgs.

Ethox Corp., Datasheet, "Etho–Guard: High Gas Barrier Media Bag", 5 pgs., undated.

Ethox Corp., catalog "Contract Manufacturing, Sterilization, & Microbiology Services", 8 pgs., undated.

Ethox Corp., website printouts, www.ethoxcorp.com, Etho-Guard™ High Gas Barrir Media Bag (1 pg.); "SteriCell® Culture Containers" (1 pg.); Ethox Corp. Home Page (1 pg.).

Nexell Inc., website printout, www.nexellinc.com, "Innovative Programs to Secure Nexell's Future", Jan. 27, 2000, 2 pgs.

FMI, Inc. Datasheets "Integrated Biotech Systems Design" (1 pg.); "Flexible Barrier Containers" (1 pg.); "Intasept™ Superior Aseptic Transfer Technology" (1 pg.); "Manufacturing & Assembly Clean Room Facility" (1 pg.); Aug. 1997.

FMI, Inc., website printouts, www.fmi–inc.com, 3 pgs. Feb. 7, 2000.

Newport Biosystems Inc., catalog "Cleanroom in a Bag!", 2 pgs., undated.

Newport Biosystem Inc., website printout www.bioweb.net., "Biobag Product List", 2 pgs., Feb. 3, 2000.

Charter Medical, Ltd., website printouts www.chartermed.com, Biopharmaceutical Products Division, 14 pgs., Jan. 29, 2000.

TC Tech Corporation, Catalog "Single Use Containers for Fluid Storage", 8 pgs., undated.

TC Tech Corporation, Catalog "SiCulture: The New Cell Culture Alternative", 4 pgs., Mar. 1999.

TC Tech Corporation Flyer #1.1 "Silicon Bag For Production–Scale Inoculations" (1 pg.); Tech Flyer #1.2 "Bag Comparison Study" (1 pg.); Tech Flyer #2.1 "Silicone Bag for Recombinant Protein Production" (1 pg.); Tech Flyer #3.0 "Cost to Produce Analysis using the SiCulture™ Silicone Bag"(1 pg.); Tech Flyer #4.0 "Cell Attachment Study with Surface–Modified SiCulture Bags" (1 pg.); undated.

TC Tech Corporation Product Insert "SiCulture™ Silicone Cell Culture Growth Bag", 2 pgs., undated.

TC Tech Corporation, website printouts, www.tc–tech.com "SiCulture™ Cell culture bags" (2 pgs.), "Nalgene Tank Liners" (3 pgs.); Company profile (1 pg.); Flexible Media Storage Bags (1 pg.); "Cell Culture Media Bags" (2 pgs.); Jan. 24, 2000.

HyClone, catalog "Bioprocess Container Systems: Standard and Custom Engineering", 8 pgs., undated.

HyClone, advertisement "Introducing the clear _", 3 pgs., undated.

HyClone "Complete Mixing Resuspension System", 4 pgs., undated.

HyClone "Liquid Media: Solutions in Large and Small Volume Liquid Media", 12 pgs., undated.

HyClone, website printout www.hyclone.com, "Bioprocess Containers", 9 pgs., undated.

Aastrom Biosciences Inc., advertisement "Pioneering Clinical Systems for Cell Therapy", 1 pg. undated.

LJL Biosystems, advertisement, 1 pg. undated.

Stedim, advertisement, "From Drug Discovery to Drug Delivery", 4 pgs. undated.

Stedim datasheet "Stedim 30 Film Flexel Tank Liners", 2 pgs. undated.

Stedim, website printout www.stedim.com, "Biopharmaceutical Products" (1 pg.); Flexel 3–D Bag Customization (2 pgs.); Product Reference Sheet: Palletank (1 pg.); Flexboy Customization (2 pgs.); Jan. 1, 2000.

Stedim catalog "Flexel Tank Liners", 6 pg. undated.

Stedim catalog "The FLEXBOY System", 8 pgs. undated.

Stedim, catalog "The FLEXEL 3–D System", 22 pgs., undated.

Stedim catalog "A new Generation of Bio–Compatible Containers", 14 pgs., 2000.

Stedim catalog "Your Quality Resource for Standard and Custom I.V. Component Parts", 15 pg. 2000.

Stedim Contract Manufacturing "Advance Technologies for I.V. Drug Delivery", 11 pgs., 1998.

MULTI-LAYERED POLYMER BASED THIN FILM STRUCTURE FOR MEDICAL GRADE PRODUCTS

CROSS-REFERENCE TO RELATED APPLICATIONS

This is a continuation-in-part application of U.S. patent application Ser. No. 09/498,674, which was filed on Feb. 7, 2000 U.S. Pat. No. 6,461,696; which is a continuation-in-part of U.S. patent application Ser. No. 09/334,957, which was filed on Jun. 17, 1999, and is now U.S. Pat. No. 6,261,655; which is a continuation of U.S. patent application Ser. No. 08/153,602 filed on Nov. 16, 1993, and is now U.S. Pat. No. 5,998,019, all of which are incorporated herein by reference and made a part hereof.

TECHNICAL FIELD

The present invention relates generally to polymer blends for fabricating films and more particularly film that have low distortion, that are non-adherent upon steam sterilization, that are radio-frequency sealable, and that are suitable for fabricating into flexible medical containers.

BACKGROUND OF THE INVENTION

In the medical field, where beneficial agents are collected, processed and stored in containers, transported, and ultimately delivered through tubes by infusion to patients to achieve therapeutic effects, materials which are used to fabricate the containers must have a unique combination of properties. For example, in order to visually inspect solutions for particulate contaminants, the container must be optically transparent. To infuse a solution from a container by collapsing the container walls, without introducing air into the container, the material which forms the walls must be sufficiently flexible. The material must be functional over a wide range of temperatures. The material must function at low temperatures by maintaining its flexibility and toughness because some solutions, for example, certain pre-mixed drug solutions are stored and transported in containers at temperatures such as −25° C. to −30° C. to minimize the drug degradation. The material must also be functional at high temperatures to withstand the heat of sterilization; a process which most medical packages and nutritional products are subjected to prior to shipment. The sterilization process usually includes exposing the container to steam at temperatures typically 121° C. and at elevated pressures. Thus, the material needs to withstand the temperature and pressures without significant distortions ("heat distortion resistance").

For ease of manufacture into useful articles, it is desirable that the material be sealable using radio frequency ("RF") generally at about 27.12 MHZ. Therefore, the material should possess sufficient dielectric loss properties to convert the RF energy to thermal energy. A further requirement is to minimize the environmental impact upon the disposal of the article fabricated from the material after its intended use. For those articles that are disposed of in landfills, it is desirable to use as little material as possible and avoid the incorporation of low molecular weight leachable components to construct the article. Thus, the material should be light weight and have good mechanical strength. Further benefits are realized by using a material which may be recycled by thermoplastically reprocessing the post-consumer article into other useful articles.

For those containers that are disposed of through incineration, it is necessary to use a material that helps to eliminate the dangers of biological hazards, and to minimize or eliminate entirely the formation of inorganic acids which are environmentally harmful, irritating, and corrosive, or other products which are harmful, irritating, or otherwise objectionable upon incineration.

It is also desirable that the material be free from or have a low content of low molecular weight additives such as plasticizers, stabilizers and the like which could be released into the medications or biological fluids or tissues thereby causing danger to patients using such devices or are contaminating such substances being stored or processed in such devices. For containers which hold solutions for transfusion, such contamination could make its way into the transfusion pathway and into the patient causing injury or death to the patient.

Traditional flexible polyvinyl chloride materials meets a number of, and in some cases, most of the above-mentioned requirements. Polyvinyl chloride ("PVC") also offers the distinct advantage of being one of the most cost effective materials for constructing devices which meet the above requirements. However, PVC may generate objectionable amounts of hydrogen chloride (or hydrochloric acid when contacted with water) upon incineration, causing corrosion of the incinerator. PVC sometimes contains plasticizers which may leach into drugs or biological fluids or tissues that come in contact with PVC formulations. Thus, many materials have been devised to replace PVC. However, most alternate materials are too expensive to implement and still do not meet all of the above requirements.

There have been many attempts to develop a film material to replace PVC, but most attempts have been unsuccessful for one reason or another. For example, in U.S. Pat. No. 4,966,795, which discloses multilayer film compositions capable of withstanding the steam sterilization, cannot be welded by radio frequency dielectric heating thus cannot be assembled by this rapid, low costs, reliable and practical process. European Application No. EP 0 310 143 A1 discloses multilayer films that meet most of the requirements, and can be RF welded. However, components of the disclosed film are cross-linked by radiation and, therefore, cannot be recycled by the standard thermoplastic processing methods. In addition, due to the irradiation step, appreciable amounts of acetic acid is liberated and trapped in the material. Upon steam sterilization, the acetic acid migrates into the packaging contents as a contaminant and by altering the pH of the contents acts as a potential chemical reactant to the contents or as a catalyst to the degradation of the contents.

U.S. Pat. No. 5,998,019, which is owned by the same assignee of the present invention, discloses multi-layered polymer structures that solve many, if not all, of the foregoing problems. However, one problem with the structures of the '019 patent is that the internal solution contact layer of those structures sticks to either itself or to other similar structures (such as other films or when formed into a container) after the autoclave sterilization process. The internal solution contact layer of the '019 patent is either an RF sealable layer or a blend of two polyolefins and a compatibilizing agent of a styrene and hydrocarbon block copolymer. The specific composition of the RF sealable layer is disclosed therein and is also the subject of U.S. Pat. Nos. 5,849,843; 5,854,347 and 5,686,527, which are owned by the present assignee and are incorporated by reference.

U.S. Pat. No. 6,083,587, also owned by the present assignee, provides a multilayer structure where the internal solution contact layer can be a polyolefin selected from the homopolymers and copolymers of alpha-olefins having about 2 to about 20 carbons. However, the '587 patent does not disclose a structure wherein an internal, non-solution contact layer is RF sealable layer or comprised of an RF susceptible polymer.

The main objective of the present invention is the creation of thermoplastic materials which are, overall, superior to those materials, of which we are aware, which have been heretofore known to the art or have been commercially used or marketed. The properties of such materials includes flexibility, extensibility, and strain recoverability, not just at room temperatures, but through a wide range of ambient and refrigerated temperatures. The material should be sufficiently optically transparent for visual inspection, and steam sterilizable at temperatures up to 121° C. The material should be capable of being subjected to significant strains without exhibiting strain whitening, which can indicate a physical and a cosmetic defect. A further objective is that the material be capable of assembly by the RF methods.

Another objective is that the material be substantially free of low molecular weight leachable additives, and be capable of safe disposal by incineration without the generation of significant amounts of corrosive inorganic acids. Another objective is that the material be recyclable by standard thermoplastic processing methods after use. It is also desirable that the material incorporate reground scrap material recovered during the manufacturing process to save material costs and reduce manufacturing waste. It is also desirable that the material not have its RF sealable layer able to contact itself of that of another film, minimizing the film from sticking to itself or to other films during, or subsequent to, the autoclave process. It is also desirable that the material not be oriented, as oriented films may shrink when subjected to heat. Finally, the material should serve as a cost effective alternative to various PVC formulations currently being used for medical devices.

When more than one polymer is blended to form an alloying composition, it is difficult to achieve all of the above objectives simultaneously. For example, in most instances alloy composition may scatter light; thus, they fail to meet the optical clarity objective. The light scattering intensity (measured by haze) depends on the domain size of components in the micrometer ($\mu$m) range, and the proximity of the refractive indices of the components. As a general rule, the selection of components that can be satisfactorily processed into very small domain sizes, and yet with a minimum of refractive index mismatches, is a difficult task. Also, film structures heretofore known usually contain stearates or fatty acids in the solution-contact layer of the structure, thereby permitting those undesirable components to leach into the solution in contact with the film structure.

The present invention is provided to solve these and other problems.

SUMMARY OF THE INVENTION

In accordance with the present invention, certain multiple layer polymer based structures are disclosed. The films may be fabricated into medical grade articles such as containers for storing medical solutions or blood products, blood bags, and related items, or other products constructed from multi-layered structures.

It is an object of the present invention to prepare a multi-layered film having the following physical properties: (1) a mechanical modulus less than 40,000 psi and more preferably less than 25,000 psi when measured in accordance with ASTM D-882, (2) a greater than or equal to 70%, and more preferably greater than or equal to 75%, recovery in length after an initial deformation of 20%, (3) and optical haze of less than 30%, and more preferably less than 15%, when measured for a composition 9 mils thick and in accordance to ASTM D-1003, (4) a loss tangent measured at 1 Hz at processing temperatures is greater than 1.0, and more preferably greater than 2.0, (5) the content of elemental halogens is less than 0.1%, and more preferably less than 0.01%, (6) the low molecular weight water soluble fraction is less than 0.1%, and more preferably less than 0.005%, (7) the maximum dielectric loss between 1 and 60 MHZ and between the temperature range of 25° C. to 250° C. is greater than or equal to 0.05 and more preferably greater than or equal to 0.1, (8) autoclave resistance measured by sample creep at 121° C. under 27 psi loading is less than or equal to 60% and more preferably less than or equal to 20%, and (9) there is no strain whitening after being strained at moderate speeds of about 20 inches (50 cm) per minute at about 100% elongation and the presence of strain whitening is noted or the lack thereof.

The multiple layer structure of the present invention has two separate skin layers, each preferably containing a propylene containing polymer. The structure further includes a radio frequency ("RF") susceptible layer adhered to the skin layer. The RF layer is composed of a first component of a polypropylene polymer, a second component of a non propylene polyolefin (one that does not contain propylene repeating units), a third component of a radio frequency susceptible polymer, and a fourth component of a polymeric compatibilizing agent. In alternate embodiments, additional layers such as core, scrap, and barrier layers are added to the skin and RF layers to confer additional or enhanced functionality of the resultant film structure.

As stated above, the RF layer is the subject of U.S. Pat. Nos. 5,849,843; 5,854,347 and 5,686,527, which are incorporated herein by reference and made a part hereof. The multi-layered film structure of the present invention offers additional features that the compositions of the RF layer alone do not provide. The additional features of the multi-layer film include an exterior surface gloss and reduced tackiness to the outside surface of the film structure. Additionally, the multilayered film structure has improved vapor barrier properties, greater strength and optical clarity, and is cleaner or has reduced tendency to migrate into the contents of the container. Finally, the internal solution contact layer of the present invention minimizes partial and total sticking of that layer to itself or other films during, and subsequent to, the autoclave process.

The core layer, which is interposed between the skin layer and the RF layer consists of three components. Preferably, the first component is polypropylene which constitutes about 40% of the core layer, the second component is an ultra low density polyethylene ("ULDPE") which constitutes about 50% by weight of the core layer, and the third component is styrene-hydrocarbon block copolymer and more preferably an SEBS block copolymer which constitutes about 10% by weight of the core layer. The entire core layer should be about 4.0 mils thick.

It is also desirable, for economic reasons among others, to incorporate reground scrap material recovered during the processing of the film material back into the composition of a film structure. This can lead to using significant amount of scrap material as a weight percent of the entire layer structure, thereby substantially decreasing the costs of the film product. The reground scrap may be incorporated into the above-described structure either as an additional discrete layer located somewhere between the skin layer and the RF layer or may be blended into the core layer as an additional component. In either case, significant resources are saved by reprocessing the scrap material.

To increase gas barrier properties of the structure, it is desirable to incorporate a barrier layer between the skin layer and the RF layer. The barrier layer may be attached to surrounding layers using adhesive tie layers. The barrier layer may be selected from ethylene vinyl alcohols such as that sold under the name Evalca (Evalca Co.), highly glassy or crystalline polyamide such as Sclar PA® (Dupont Chemical Co.), high nitrile content acrylonitrile copolymers such as those sold under the tradename Barex® sold by British Petroleum.

Films having the aforesaid structure and compositions have been found to be flexible, optically clear, non-strain whitening, and steam and radiation sterilizable. Additionally, the films are compatible with medical applications because the components that constitute the film have a minimal extractability to the fluids and contents with which the composition comes into contact. Further, the films are environmentally sound in that they do not generate harmful degradants upon incineration. Finally, the films provide a cost effective alternative to PVC.

Additional features and advantages of the present invention are described in, and will be apparent from, the drawing and the detailed description of the presently preferred embodiments.

DETAILED DESCRIPTION OF THE PREFERRED EMBODIMENT:

While this invention is susceptible of embodiments in many different forms, and will herein be described in detail, preferred embodiments of the invention are disclosed with the understanding that the present disclosure is to be considered as exemplifications of the principles of the invention and are not intended to limit the broad aspects of the invention to the embodiments illustrated.

According to the present invention, multiple layered film structures are provided which meet the requirements set forth above.

Figure 1:
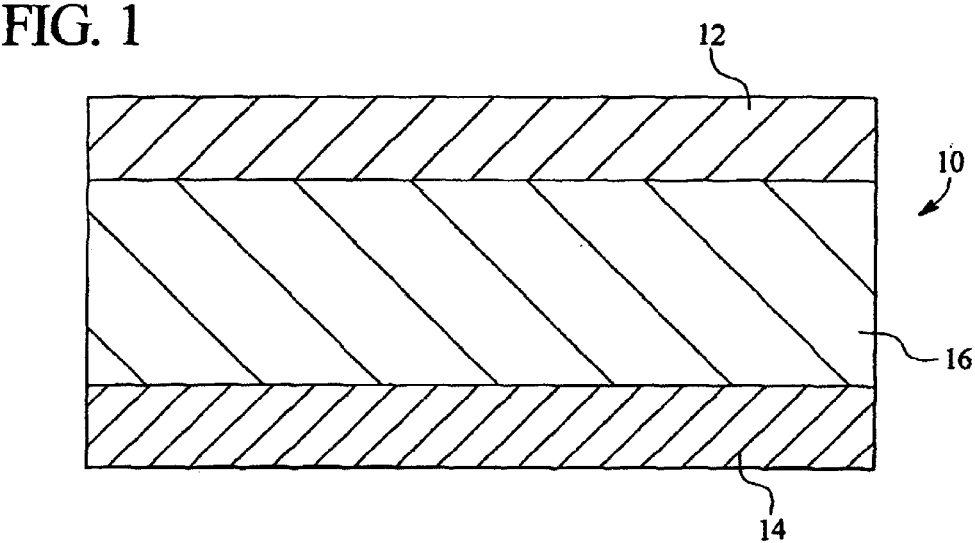
FIG. 1 shows a cross-sectional view of a three layered film structure of the present invention.

FIG. 1 shows a three layered film structure 10 having a first skin layer 12, second skin layer 14, and a radio frequency ("RF") susceptible layer 16. The first skin layer 12 and second skin layer 14 confer heat distortion resistance and abrasion resistance. Another benefit of the skin layers is that it each of them is substantially, and preferably completely, free of erucamide and stearate components, thereby reducing, and preferably eliminating, any leaching of those components into the solution in contact with the film structure. A further benefit of the second skin layer is that it improves the overall appearance of the film structure by reducing surface blemishes.

The first skin layer and the second skin layer each preferably are a propylene-containing polymer. Suitable propylene-containing polymers include those selected from the group consisting of homopolymers of polypropylene, copolymers and terpolymers of propylene with one or more comonomers selected from $\alpha$-olefins having from 2 to about 18 carbons. Suitable polypropylene copolymers and terpolymers include random or block propylene and ethylene copolymers or random or block propylene/ethylene/butene terpolymers. Suitable propylene and $\alpha$-olefin copolymers are sold by Montell under the tradenames PRO FAX, PRO FAX ULTRA and CATALLOY and by Fina Oil & Chemical Company (n/k/a ATOFINA) under the Fina® tradename series, such as Fina 6671 XBB, 6573 XHC, 7450 HC, and 7602 Z. The first skin layer 12 and the second skin layer 14 should have a thickness within the range of from about 0.2 to about 3.0 mils thick. Both skin layers may further include a second component of a styrene and hydrocarbon copolymer, more preferable a styrene and hydrocarbon block copolymer and even more preferably a styro-ethylene butene styrene tri-block copolymer SEBS, which is commercially available from the Shell Chemical Company/Ripplewood Holdings LLC under the tradename KRATON™ product series. More preferably, the SEBS component is KRATON™ G-1657.

The RF susceptible layer 16 of the present invention should have a dielectric loss of greater than 0.05 at frequencies within the range of 1–60 MHz within a temperature range of ambient to 250° C. The RF layer 16 preferably has four components. The RF layer 16 confers RF sealability, flexibility, heat distortion resistance, and compatibility to the film structure 10. The first component of the RF layer 16 is chosen from polypropylene copolymers and preferably the propylene alpha-olefin random copolymers ("PPE"). The PPE's possess the required rigidity and the resistance to yielding at the autoclave temperatures of about 121° C. However, by themselves, the PPE's are too rigid to meet the flexibility requirements. When combined by alloying with certain low modulus polymers, good flexibility can be achieved.

These low modulus copolymers can include ethylene based copolymers such as ethylene-co-vinyl acetate ("EVA"), ethylene co-alpha olefins, or the so-called ultra low density (typically less than 0.90 Kg/L) polyethylenes ("ULDPE"). These ULDPE include those commercially available products sold under the trademarks TAFMER® (Mitsui Petrochemical Co.) under the product designation A485, Exact® (Exxon Chemical Company) under the product designations 4023–4024, and Insite® technology polymers (Dow Chemical Co.). In addition, polybutene-1 ("PB"), such as those sold by Shell Chemical Company under product designations PB-8010, PB-8310; thermoplastic elastomers based on SEBS block copolymers, (Shell Chemical Company), poly isobutene ("PIB") under the product designations Vistanex L-80, L-100, L-120, L-140 (Exxon Chemical Company), ethylene alkyl acrylate, the methyl acrylate copolymers ("EMA") such as those under the product designation EMAC 2707, and DS-1130 (Chevron), and n-butyl acrylates ("ENBA") (Quantum Chemical) were found to be acceptable copolymers. Ethylene copolymers such as the acrylic and methacrylic acid copolymers and their partially neutralized salts and ionomers, such as PRIMACOR® (Dow Chemical Company) and SURYLN® (E.I. DuPont de Nemours & Company) were also acceptable. Typically, ethylene based copolymers have melting point temperatures of less than about 110° C. are not suited for autoclaving at 121° C. applications. Furthermore, only a limited range of proportions of each component allows the simultaneous fulfillment of the flexibility and autoclavability requirements.

Preferably the first component is chosen from the group of polypropylene homo and random copolymers with alpha olefins. The first component constitutes approximately 30–60%, more preferably 35–45%, and most preferably 45%, by weight of the RF layer. For example, a preferred first component comprises random copolymers of propylene and ethylene where the ethylene content is in an amount within the range of 0–6%, and more preferably from about 2% to about 6% by weight of the copolymer.

The second component of the RF layer 16 confers flexibility and low temperature ductility to the RF layer 16 and is chosen from the group consisting of polyolefins that do not have propylene repeating units ("non-propylene based polyolefins") including ethylene copolymers including ULDPE, polybutene, butene ethylene copolymers, ethylene vinyl acetate copolymers with vinyl acetate contents between approximately 18–50%, ethylene methyl acrylate copolymers with methyl acrylate contents being between approximately 20–40%, ethylene n-butyl acrylate copolymers with n-butyl acrylate content of between 20–40%, ethylene acrylic acid copolymers with the acrylic acid content of greater than approximately 15%. An example of these products are sold under such product designations as Tafmer A-4085 (Mitsui), EMAC DS-1130 (Chevron), Exact 4023, 4024 and 4028 (Exxon). Preferably, the second component is either ULDPE sold by Mitsui Petrochemical Company under the designation TAFMER A-4085, or polybutene-1, PB8010 and PB8310 (Shell Chemical Co.), and should constitute approximately 25–50%, more preferably 35–45%, and most preferably 45%, by weight of the film.

The first and second components of the RF layer 16 may be replaced by a single component selected from a high melting temperature and flexible olefins such as those polypropylenes sold by the Rexene Company under the product designation FPO. The melting point temperature of this component should be greater than 130° C. and the modulus less than 20,000 psi. This component should constitute between 30–60% by weight of the RF layer.

To impart RF dielectric loss to the RF layer 16, certain known high dielectric loss ingredients are included as the third component of the film structure 10. For example, EVA and EMA of sufficiently high co-monomer contents exhibit significant loss properties at 27 MHZ to allow the compositions to be sealed by the dielectric process. Polyamides as a class of material, and ethylene vinyl alcohol ("EVOH") copolymers (typically produced by hydrolysing EVA copolymers), both possess high dielectric loss properties at suitable temperatures. Other active materials include PVC, vinylidine chlorides, and fluorides, copolymer of bisphenol-A and epichlorohydrines known as PHENOXYS® (Union Carbide). However, significant contents of these chlorine and fluorine containing polymers would make them environmentally unsound as incineration of such a material would generate inorganic acids. Therefore, the third component of the RF layer 16 is preferably chosen from the class of polyamides.

Preferably, the polyamides of the present invention will be chosen from aliphatic polyamides resulting from the condensation reaction of di-amines having a carbon number within a range of 2–13, aliphatic polyamides resulting from a condensation reaction of di-acids having a carbon number within a range of 2–13, polyamides resulting from the condensation reaction of dimer fatty acids, and amide containing copolymers (random, block or graft).

Polyamides such as nylons are widely used in film material because they offer abrasion resistance to the film. However, rarely are the nylons found in the layer that contacts medical solutions as they typically contaminate the solution by leaching out into the solution. However, it has been found by the applicants of the present invention that various dimer fatty acid polyamides sold by, for example, Henkel Corporation under the product designations MAC-ROMELT and VERSAMID do not lead to such contamination and thus are the most preferred third component of the RF layer 16. The third component should constitute approximately 3–40%, more preferably between 7–13%, and most preferably 10%, by weight of the RF layer 16.

The fourth component of the RF layer 16 confers compatibility between the polar and nonpolar components of the RF layer 16. The fourth component was chosen from styrene-hydrocarbon block copolymers and preferably SEBS block copolymers that are modified by maleic anhydride, epoxy, or carboxylate functionalities. Most preferably the fourth component is an SEBS block copolymer that is maleic anhydride functionalized. Such a product is sold by Shell Chemical Company/Ripplewood Holdings LLC under product designation KRATON™ RP-6509. The fourth component should constitute approximately 5–40%, more preferably 7–13%, and most preferably 10% by weight of the RF layer 16.

It may also be desirable to include a fifth component to the RF layer 16 of an SEBS block copolymer, not modified by the above functional groups, such as the one sold by the Shell Chemical Company/Ripplewood Holdings LLC under the product designation KRATON™ G-1652. This component should constitute between 5–40% by weight of the RF layer 16, more preferably between 7–13%, and most preferably 10%.

Preferably the RF susceptible layer 16 will have a thickness within the range of 1–15 mils are more preferably 5.0 mils–8.0 mils, and most preferably 6.0 mils. The skin layer will have a thickness within the range of 0.2–3.0 mils and most preferably 0.5 mils.

Figure 2:
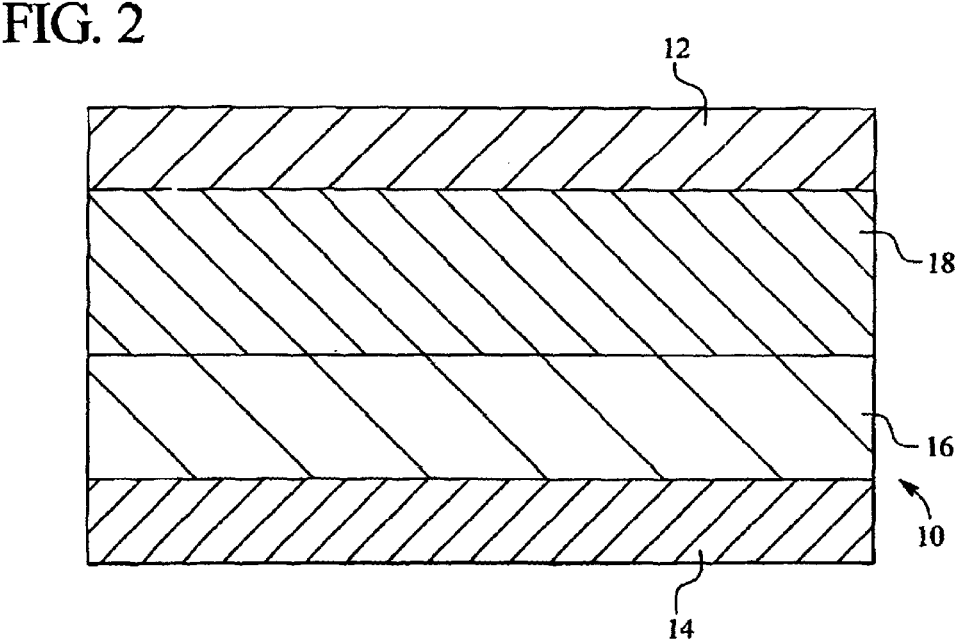
FIG. 2 shows a cross-sectional view of a three layered film structure of the present invention including a core layer added to the film of FIG. 1.

FIG. 2 shows another embodiment of the present invention having a non-radio frequency susceptible core layer 18 interposed between the first skin layer 12 and the RF layer 16. The core layer 18 confers heat distortion resistance, and flexibility to the film structure 10 and compatibility among the components of the film structure 10. Preferably, the core layer will have a thickness within the range of 0.5–10 mils and more preferably 1–4 mils. The core layer 18 includes three components. The first component is a polyolefin and preferably a polypropylene in an amount that constitutes from about 20 to about 60% by weight of the core layer 18, more preferably from about 35 to about 50%, and most preferably 45% of the core layer 18.

The second component of the core layer 18 is chosen from a group consisting of compounds that confer flexibility to the core layer 18 including ULDPE, polybutene copolymers. Preferably, the second component of the core layer is ULDPE or polybutene-1 in an amount by weight of from about 40% to about 60%, more preferably from about 40 to about 50%, and most preferably 40%.

The third component of the core layer 18 is chosen from a group of compounds that confer compatibility among the components of the core layer 18 and includes styrene-hydrocarbon block copolymers and most preferably SEBS block copolymers. The third component is in an amount preferably within a range of from about 5 to about 40% by weight of the core layer 18, more preferably from about 7 to about 15%, and most preferably 15%.

It is also possible to add as a fourth component of the core layer 18, reground trim scrap material recovered during the manufacturing of containers. The scrap material is dispersed throughout the core layer 18. Scrap may be added in an amount preferably between approximately from about 0 to about 50% by weight of the core layer 18, and more preferably within the range of from about 10 to about 30% and most preferably within the range of from about 3 to about 12%. The present invention also contemplates any predetermined number of core layers (e.g., a second core layer) disposed in the multilayer film structure.

Figure 3:
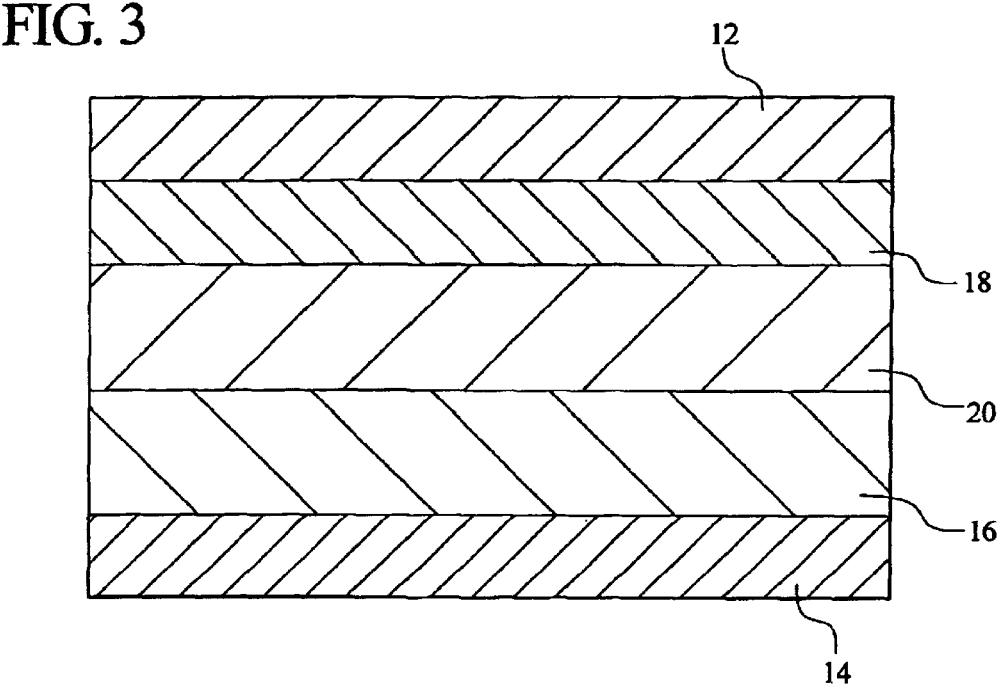
FIG. 3 shows a cross-sectional view of a four layered structure of the present invention having a discrete layer of scrap material between the RF and the core layers.
Figure 4:
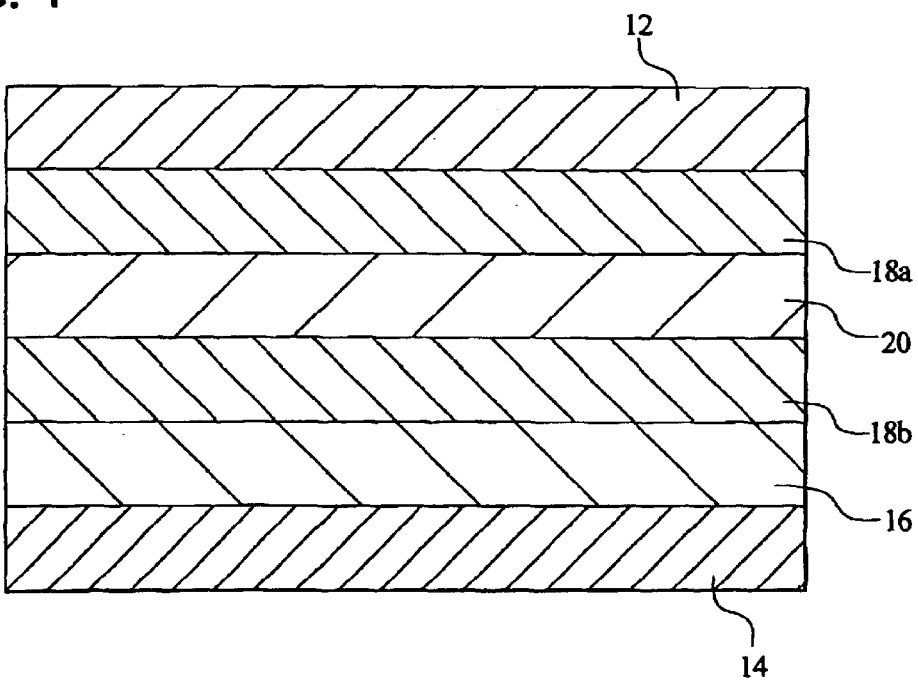
FIG. 4 shows a cross-sectional view of a film structure using reground scrap as a discrete layer that splits the core layer into two core layers.

FIG. 3 shows another embodiment of the multiple layer film structure having the first skin layer 12, the second skin layer 14, the RF layer 16, and the core layer 18 as described above with an additional discrete layer of scrap 20 between the core layer 18 and the RF layer 16. Another embodiment (not shown) positions the layer of scrap 20 between the first skin layer 12 and the core layer 18. FIG. 4 shows the scrap layer 20 dividing the core layer 16 into first and second core layers 18*a* and 18*b*. Preferably, the layer of regrind should have a thickness within the range of 0.5–5.0 mils and most preferably 1.0 mils.

Figure 5:
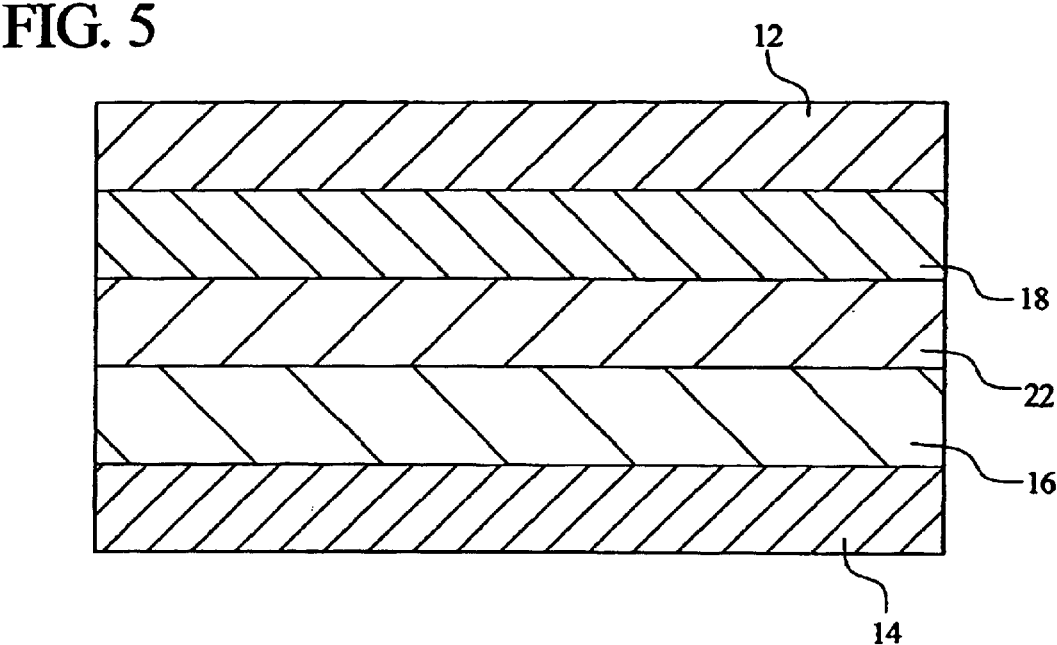
FIG. 5 shows a cross-sectional view of a film structure of the present invention having a barrier layer between the core and the RF layers.
Figure 6:
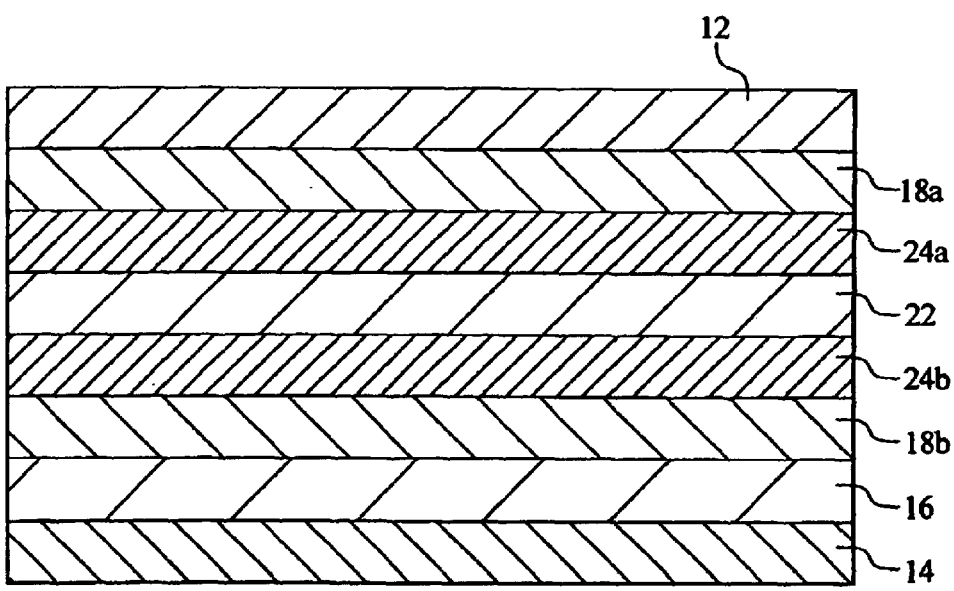
FIG. 6 shows the same structure of FIG. 5 except the barrier layer divides the core layer into two core layers.

FIG. 5 shows another embodiment of the present invention having five layers including the first skin 12, the second skin 14, the RF layer 16, and the core layer 18 as discussed above, with a barrier layer 22 interposed between the core 18 and RF layers 16. In another embodiment (not shown), the barrier layer 22 is interposed between the first skin layer 12 and the core layer 18. In still yet another embodiment (not shown), the barrier layer 22 divides the core layer 18 into a first core layer 18*a* and second core layer 18*b*. As shown in FIG. 6, the present invention also provides the barrier layer 22 being interposed between two opposing tie layers 24*a* and 24*b*, which are further interposed between the first and second core layers 18*a* and 18*b*.

The barrier layer 22 increases the gas barrier properties of the film structure 10. The barrier layer 22 is selected from the group consisting ethylene vinyl alcohols such as that sold under the name Evalca (Evalca Co.), highly glassy or crystalline polyamide such as Sclar PA® (Dupont Chemical Co.), high nitrile content acrylonitrile copolymers such as Barex® sold by British Petroleum. Preferably, the barrier layer 22 is ethylene vinyl alcohol, and has a thickness within the range of 0.3–1.5 mils and most preferably 1.0 mils. The tie layers 24 may be selected from modified ethylene and propylene copolymers such as those sold under the product designations Prexar (Quantum Chemical Co.) and Bynel (Dupont) and should have a thickness within the range of 0.2–1.0 mils and most preferably 0.5 mil.

Figure 7:
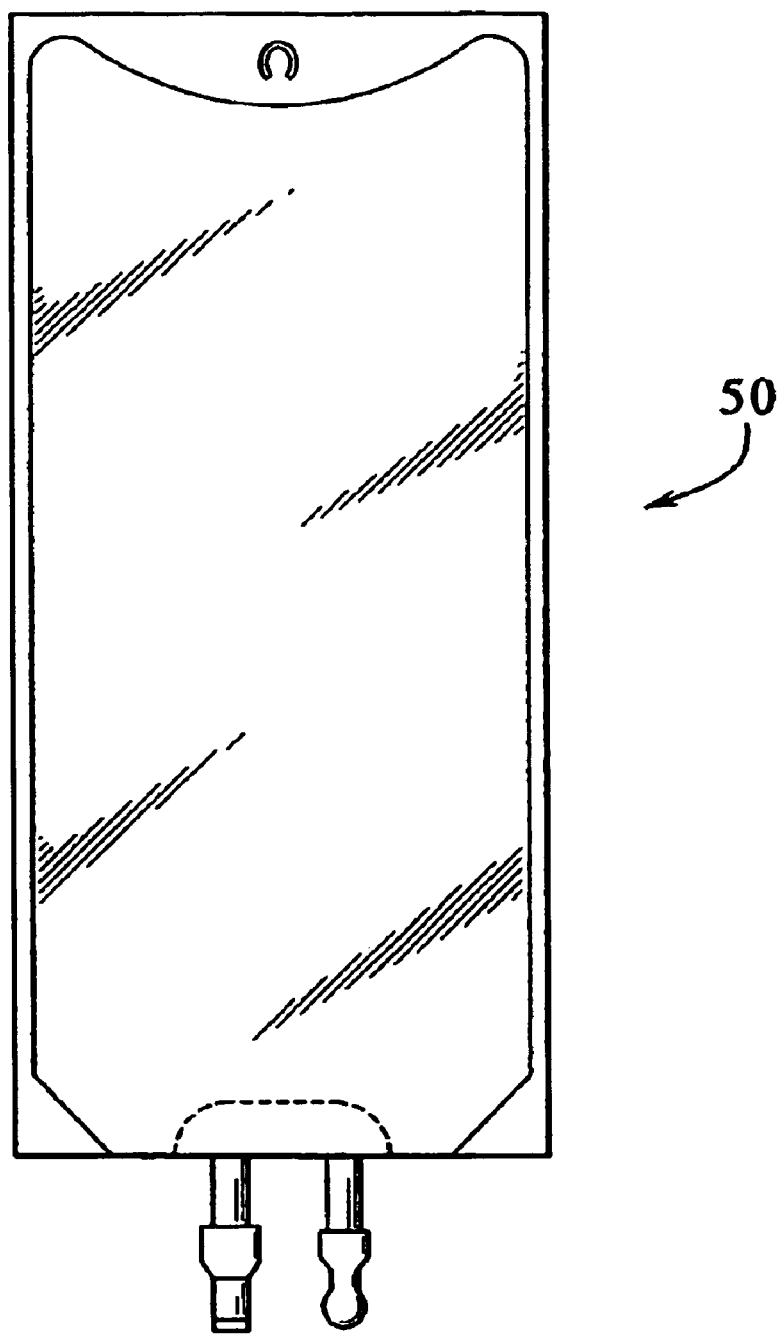
FIG. 7 shows a container constructed from one of the film structures of the present invention.

The above layers may be processed by coextrusion, extrusion coating, or other acceptable process. These materials may be used to manufacture I.V. therapy bags such as the one shown in FIG. 7 and generally designated as 50.

EXAMPLES

It is understood that the present invention is not limited to the particular examples described herein. The examples of Table 1 are proffered for the purpose of describing particular embodiments and are not intended to be limiting.

TABLE 1

| Formula No. | First Skin | RF Susceptible Skin | Second Skin |
|---|---|---|---|
| 1 | Fina ® 6671 XBB | 40–47% Polypropylene<br>40–51% Polyethylene<br>3–10% SEBS<br>3–10% Polyamide<br>0–30% Regrind scrap | Fina ® 6671 XBB |
| 2 | 80–100% Fina ® 6671 XBB<br>20–0% Kraton ™ G-1657 | 40–47% Polypropylene<br>40–51% Polyethylene<br>3–10% SEBS<br>3–10% Polyamide<br>0–30% Regrind scrap | 80–100% Fina ® 6671 XBB<br>0–20% Kraton ™ G-1657 |
| 3 | Fina ® 7602 Z | 40–47% Polypropylene<br>40–51% Polyethylene<br>3–10% SEBS<br>3–10% Polyamide<br>0–30% Regrind scrap | Fina ® 7602Z |
| 4 | Fina ® 4540 HC | 40–47% Polypropylene<br>40–51% Polyethylene<br>3–10% SEBS<br>3–10% Polyamide<br>0–30% Regrind scrap | Fina ® 7450 HC |
| 5 | Fina 6573 ® XGC | 40–47% Polypropylene<br>40–51% Polyethylene<br>3–10% SEBS<br>3–10% Polyamide<br>0–30% Regrind scrap | Fina ® 6573 XHC |
| 6 | 80–100% Fina 6573 XHC<br>20–0% Kraton ™ G-1657 | 40–47% Polypropylene<br>40–51% Polyethylene<br>3–10% SEBS<br>3–10% Polyamide<br>0–30% Regrind scrap | 80–100% Fina ® XHC<br>0–20% Kraton ™ G-1657 |

The above working examples, as well as other embodiments contemplated by the present invention, are believed to having the following properties measured in conformance with the experimental details the inventors disclosed in U.S. Pat. No. 6,261,655, which is incorporated by reference:

(a) a mechanical modulus less than 40,000 psi measured according to ASTM D-882;
(b) a percent recovery in length of greater than or equal to about 70% percent after an initial 20% deformation;
(c) an optical haze of less than about 30%, preferably less than 20%, measured in accordance to ASTM D-1003 when the composition is processed into a film 9 mils in thickness;
(d) a loss tangent greater than about 1.0 at 1 Hz measured at melt processing temperatures;
(e) an elemental halogen content by weight of less than about 0.1%;
(f) a low molecular weight water soluble fraction of less than about 0.1%;
(g) a dielectric loss of greater than or equal to about 0.05 when measured between 1 and 60 MHZ and over temperatures of 25 to 250° C. of the composition;
(h) a sample creep of less than or equal to about 60% when measured at 121° C. for a 1 inch strip under 27 psi loading for one hour; and,
(i) no strain whitening after being strained at moderate speeds of about 20 inches (50 cm) per minute to about 100% elongation (twice the original length).

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A multiple layer structure comprising:
a first skin layer;
a radio frequency ("RF") susceptible layer adhered to the first skin layer, the RF layer having a first component of a propylene based polymer, a second component of a non-propylene polyolefin, a third component of a radio frequency susceptible polymer, and a fourth component of a polymeric compatibilizing agent; and
a second skin layer adhered to the RF layer and opposed to the first skin layer; the structure having physical properties within the range
a<40,000 psi;
b>=70%;
c<30%;
d>1.0;
e<0.1%;
f<0.1%;
g>=0.05
h<=60%;
i=0;
wherein:
a is the mechanical modulus of the composition measured according to ASTM D-882;
b is the percent recovery in length of the composition after an initial 20% deformation;
c is the optical haze of the composition processed into a film 9 mils in thickness measured in accordance to ASTM D-1003;
d is the loss tangent of the composition at 1 Hz measured at melt processing temperatures;
e is the elemental halogen content by weight of the composition;
f is the low molecular weight water soluble fraction of the composition;
g is the dielectric loss between 1 and 60 MHZ and over temperatures of 25 to 250° C. of the composition;
h is the sample creep measured at 121° C. for a 1 inch strip of the composition under 27 psi loading; and,
i the composition exhibits no strain whitening after being strained at moderate speeds of about 20 inches (50 cm) per minute to about 100% elongation (twice the original length) and the presence of strain whitening (indicated by 1) or lack thereof (indicated by 0) is noted.

2. A multiple layer structure comprising:
a first skin layer of a propylene-containing polymer;
a radio frequency ("RF") susceptible layer adhered to the first skin layer, the radio frequency susceptible layer having a dielectric loss greater than 0.05 at 1–60 MHz at temperatures of ambient to 250° C., the RF layer having a first component of a propylene based polymer, a second component of a non-propylene polyolefin, a third component of a radio frequency susceptible polymer, and a fourth component of a polymeric compatibilizing agent; and
a second skin layer adhered to the RF layer and opposed to the first skin layer, the second skin layer being a propylene-containing polymer.

3. The structure of claim 2 wherein the non propylene polyolefin of the RF layer is selected from the group of ethylene copolymers including ultra low density polyethylene, polybutene, butene ethylene copolymers, ethylene vinyl acetate copolymers with vinyl acetate contents between approximately 18–50%, ethylene methyl acrylate copolymers with methyl acrylate contents being between approximately 20–40%, ethylene n-butyl acrylate copolymers with n-butyl acrylate content of between 20–40%, ethylene acrylic acid copolymers with the acrylic acid content of greater than approximately 15%.

4. The structure of claim 2 wherein the radio frequency susceptible polymer is selected from the group consisting of polyamides, ethylene vinyl acetate with vinyl acetate in an amount of 18–50% by weight, ethylene methyl acrylate copolymers with methyl acrylate in an amount between 20%–40% by weight, ethylene vinyl alcohol with vinyl alcohol in an amount of 15%–70%.

5. The structure of claim 4 wherein the polyamide is selected from a group consisting of: aliphatic polyamides resulting from the condensation reaction of di-amines having a carbon number within a range of 2–13, aliphatic polyamides resulting from a condensation reaction of di-acids having a carbon number within a range of 2–13, polyamides resulting from the condensation reaction of dimer fatty acids, and amide containing copolymers.

6. The structure of claim 2 wherein the polymeric compatibilizing agent of the RF layer is a styrene ethylene-butene styrene block copolymer.

7. The structure of claim 6 wherein the styrene ethylene-butene styrene block copolymer is maleic anhydride functionalized.

8. The structure of claim 2 further including a first non radio frequency susceptible core layer interposed between the first skin layer and the RF layer.

9. The structure of claim 8 wherein the first core layer includes: a first component of a polyolefin; a second component selected from the group consisting of ultra low density polyethylene, polybutene copolymers, and, a third component of a compatibilizing agent.

10. The structure of claim 9 wherein the polyolefin of the first component of the first core layer is a polypropylene.

11. The structure of claim 9 wherein the second component of the first core layer is an ultra low density polyethylene.

12. The structure of claim 9 wherein the third component of the first core layer is a styrene ethylene-butene styrene block copolymer.

13. The structure of claim 9 wherein the first core layer includes a fourth component consisting of a scrap material.

14. The structure of claim 9 further including a layer of scrap material interposed between the first core layer and the first skin layer.

15. The structure of claim 9 further including a layer of scrap material interposed between the first core layer and the radio frequency susceptible layer.

16. The structure of claim 9 further including: a scrap layer adhered to the first core layer on a side opposite the first skin layer; and, a second core layer attached to the scrap layer on a side opposite the first core layer.

17. The structure of claim 9 further including a barrier layer.

18. The structure of claim 17 wherein the barrier layer is interposed between the first core layer and the RF layer.

19. The structure of claim 17 wherein the barrier layer is interposed between the first core layer and the first skin layer.

20. The structure of claim 17 wherein the barrier layer is selected from the group consisting of ethylene vinyl alcohols, and glassy polyamides.

21. The structure of claim 9 further including a barrier layer adhered to the first core layer on a side opposite the first skin layer; and, a second core layer adhered to the barrier layer on side opposite the first core layer.

22. The structure of claim 21 further including two tie layers one of each tie layers being adhered to opposite sides of the barrier layer.

23. The structure of claim 21 wherein the tie layers are modified ethylene and propylene copolymers.

24. A multiple layer structure comprising:
a first skin layer of a propylene-containing polymer;
a radio frequency ("RF") susceptible layer adhered to the first skin layer, the radio frequency susceptible layer having a dielectric loss greater than 0.05 at 1–60 MHz at temperatures of ambient to 250° C., the RF layer having a first component of a propylene based polymer in an amount in a range of 30–60% by weight of the RF layer, a second component of a non-propylene polyolefin in an amount within the range of 0–60% by weight of the RF layer, a third component of a radio frequency susceptible polymer in an amount within the range of 3–40% by weight of the RF layer, and a fourth component of a polymeric compatibilizing agent in an amount within the range of 5–40% by weight of the RF layer; and
a second skin layer adhered to the RF layer and opposed to the first skin layer, the second skin layer being a propylene-containing polymer.

25. The structure of claim 24 wherein the first component of the RF susceptible layer is polypropylene.

26. The structure of claim 25 wherein the second component of the RF susceptible layer is selected from the group of ultra low density polyethylene and polybutene-1.

27. The structure of claim 26 wherein the third component is a fatty acid polyamide.

28. The structure of claim 27 wherein the fourth component is styrene ethylene-butene styrene block copolymer.

29. The structure of claim 28 wherein the styrene ethylene-butene styrene block copolymer is maleic anhydride functionalized.

30. The structure of claim 29 wherein the components of the RF layer are in an amount within the range as a weight percentage of the RF layer as follows: first component 35–45%; second component 35–45%; third component 7–13%; and, fourth component 7–13%.

31. The structure of claim 30 wherein the fatty acid polyamide is a dimer fatty acid polyamide.

32. A multiple layer structure comprising:
a first skin layer of a propylene-containing polymer;
a core layer having a side adhered to the first skin layer;
a radio frequency ("RF") susceptible layer adhered to the core layer on a side opposite the first skin layer, the radio frequency susceptible layer having a dielectric loss greater than 0.05 at 1–60 MHz at temperatures of ambient to 250° C., the RF layer being composed of a first component of a propylene based polymer in an amount in a range of 30–60% of the weight of the RF layer, a second component of a non-propylene polyolefin in an amount within the range of 25–50% of the weight of the RF layer, a third component of a radio frequency susceptible polymer in an amount within the range of 3–40% by weight of the RF layer, and a fourth component of a polymeric compatibilizing agent in an amount within the range of 5–40% by weight of the RF layer; and
a second skin layer adhered to the RF layer and opposed to the first skin layer, the second skin layer being a propylene-containing polymer.

33. The structure of claim 32 wherein the core layer is non radio frequency susceptible.

34. The structure of claim 33 wherein the second component of the RF susceptible layer is selected from the group of ultra low density polyethylene and polybutene-1, the radio frequency susceptible polymer is a dimer fatty acid polyamide, the fourth component of the RF susceptible layer is an SEBS block copolymer, the core layer includes: a first component of a polyolefin; a second component selected from the group consisting of ultra low density polyethylene, and polybutene copolymers; and a third component of a compatibilizing agent.

35. The structure of claim 34 wherein the polyolefin of the first component of the core layer is a polypropylene.

36. The structure of claim 35 wherein the second component of the core layer is an ultra low density polyethylene.

37. The structure of claim 36 wherein the compatibilizing agent of the third component of the core layer is a styrene ethylene-butene styrene block copolymer.

38. The structure of claim 37 wherein the core layer further includes a component of scrap material.

39. A multiple layer structure of stacked layers comprising: a first skin layer of a propylene-containing polymer;
a radio frequency ("RF") susceptible layer, the RF layer being composed of a first component of a propylene based polymer in an amount in a range of 30–60% of the weight of the RF layer, the radio frequency susceptible layer having a dielectric loss greater than 0.05 at 1–60 MHz at temperatures of ambient to 250° C., a second component of a non-propylene polyolefin in an amount within the range of 25–50% of the weight of the RF layer, a third component of a radio frequency susceptible polymer in an amount within the range of 3–40% by weight of the RF layer, and a fourth component of a polymeric compatibilizing agent in an amount within the range of 5–40% by weight of the RF layer; a first core layer between the first skin layer and the RF layer; and, a scrap layer attached to the core layer; and a second skin layer adhered to the RF layer and opposed to the first skin layer, the second skin layer being a propylene-containing polymer.

40. The structure of claim 39 wherein one side of the first skin layer is attached to the core layer, the scrap layer is attached to the core layer on the side opposite the first skin layer, and the RF susceptible layer is attached to the scrap layer on the side opposite the core layer.

41. The structure of claim 39 wherein one side of the first skin layer is attached to the scrap layer, the core layer is attached to the scrap layer on a side opposite the first skin layer, and the RF susceptible layer is attached to the core layer on the side opposite the scrap layer.

42. The structure of claim 41 further including a second core layer interposed between the core layer and the RF susceptible layer.

43. The structure of claim 39 wherein the second component of the RF susceptible layer is selected from the group of ultra low density polyethylene and polybutene-1, the radio frequency susceptible polymer is a dimer fatty acid polyamide, the fourth component of the RF susceptible layer is an SEBS block copolymer, the first core layer includes: a first component of a polyolefin; a second component selected from the group consisting of ultra low density polyethylene, and polybutene copolymers; and, a third component of a compatibilizing agent.

44. A multiple layer structure comprising:

a first skin layer of a propylene-containing polymer;

a radio frequency ("RF") susceptible layer, the radio frequency susceptible layer having a dielectric loss greater than 0.05 at 1–60 MHz at temperatures of ambient to 250° C., the RF layer being composed of a first component of a propylene based polymer in an amount in a range of 30–60% of the weight of the RF layer, a second component of a non-propylene polyolefin in an amount within the range of 25–50% of the weight of the RF layer, a third component of a radio frequency susceptible polymer in an amount within the range of 3–40% by weight of the RF layer, and a fourth component of a polymeric compatibilizing agent in an amount within the range of 5–40% by weight of the RF layer;

a first core layer between the first skin layer and the RF layer;

a barrier layer attached to the core layer; and a second skin layer adhered to the RF layer and opposed to the first skin layer, the second skin layer being a propylene-containing polymer.

45. The structure of claim 44 wherein one side of the first skin layer is attached to the barrier layer, the core layer is attached to the barrier layer on a side opposite the first skin layer, and the RF susceptible layer is attached to the core layer on the side opposite the barrier layer.

46. The structure of claim 45 wherein a second core layer is interposed between the core layer and the RF susceptible layer.

47. The structure of claim 44 wherein one side of the first skin layer is attached to the core layer, the barrier layer is attached to the core layer on the side opposite the first skin layer, and the RF susceptible layer is attached to the barrier layer on the side opposite the core layer.

48. The structure of claim 44 wherein the second component of the RF susceptible layer is selected from the group of ultra low density polyethylene and polybutene-1, the radio frequency susceptible polymer is a dimer fatty acid polyamide, the fourth component of the RF susceptible layer is an SEBS block copolymer, wherein the barrier layer is selected from the group consisting of ethylene vinyl alcohols, and glassy polyamides.

49. The structure of claim 44 further including two tie layers one on each side of the barrier layer.

50. The structure of claim 49 wherein the tie layers are modified ethylene and propylene copolymers.

51. A multiple layer structure comprising:

a first skin layer of a propylene-containing polymer;

a core layer having one side adhered to the first skin layer;

a radio frequency ("RF") susceptible layer adhered to the core layer on a side opposite the first skin layer, the radio frequency susceptible layer having a dielectric loss greater than 0.05 at 1–60 MHz at temperatures of ambient to 250° C., the RF layer being composed of a high melting temperature and flexible polypropylene in an amount in a range of 30–60% of the weight of the RF layer, a radio frequency susceptible polymer in an amount within the range of 5–20% by weight of the RF layer, and a polymeric compatibilizing agent in an amount within the range of 5–20% by weight of the RF layer; and a second skin layer adhered to the RF layer and opposed to the first skin layer, the second skin layer being a propylene-containing polymer.

52. The structure of claim 51 wherein the radio frequency susceptible polymer of the RF susceptible layer is a dimer fatty acid polyamide and the polymeric compatibilizing agent is a styrene ethylene-butene styrene block copolymer.

53. The structure of claim 52 wherein the core includes:

a first component of a polyolefin;

a second component selected from the group consisting of ultra low density polyethylene, and polybutene copolymers; and a third component of a compatibilizing agent.

* * * * *